(12) United States Patent
Peterman et al.

(10) Patent No.: US 8,548,873 B2
(45) Date of Patent: *Oct. 1, 2013

(54) SYSTEM AND METHOD FOR CONFIGURING A CONFIGURABLE PRODUCT

(75) Inventors: Anthony E. Peterman, Austin, TX (US); Scott Depta, Round Rock, TX (US); Matthew Krupnick, Hutto, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/489,915

(22) Filed: Jun. 6, 2012

(65) Prior Publication Data

US 2012/0246597 A1    Sep. 27, 2012

Related U.S. Application Data

(63) Continuation of application No. 11/678,705, filed on Feb. 26, 2007, now Pat. No. 8,209,237.

(51) Int. Cl.
*G06Q 30/06* (2012.01)
(52) U.S. Cl.
CPC .................................. *G06Q 30/0621* (2013.01)
USPC ....................................................... 705/26.5
(58) Field of Classification Search
USPC ........................................................ 705/26.5
See application file for complete search history.

(56) References Cited

U.S. PATENT DOCUMENTS

| | | | |
|---|---|---|---|
| 5,825,651 A | 10/1998 | Gupta et al. | |
| 5,963,953 A | 10/1999 | Cram et al. | |
| 6,167,383 A | 12/2000 | Henson | |
| 6,182,275 B1 | 1/2001 | Beelitz et al. | |
| 6,192,470 B1 | 2/2001 | Kelley et al. | |
| 6,247,128 B1 | 6/2001 | Fisher et al. | |
| 7,039,604 B1 | 5/2006 | Srinivasan et al. | |
| 7,340,416 B1 | 3/2008 | Larabee et al. | |
| 7,580,871 B2 | 8/2009 | Brunner et al. | |
| 2002/0087423 A1 | 7/2002 | Carbrey Palango et al. | |
| 2002/0156661 A1 | 10/2002 | Jones et al. | |
| 2002/0161668 A1 | 10/2002 | Lutz et al. | |

OTHER PUBLICATIONS

Unknown author, "Kubota Tractor Corporation Selects Big Machines Lean Front-End(R) to Create an Online Configurator and Quoting Solution," Business Wire, New York, Mar. 28. 2006, p. 1.
Unknown author, "FUTURESHOP.ca now offers Customers the Option to Custom Build their own Computer or Notebook online with 'Direct to U'," Canada NewsWire, Ottawa, Feb. 12, 2004, p. 1.

*Primary Examiner* — Amee A Shah
(74) *Attorney, Agent, or Firm* — Terrile, Cannatti, Chambers & Holland, LLP; Robert W. Holland

(57) ABSTRACT

Product configuration selections automatically cross-over between plural product types based upon end user component selections. If end user component selections initiate a crossover trigger, the end user is presented with an option to cross over from an initially-selected product type to a product type associated with the cross-over trigger. Upon selection of the cross-over product type, the product configuration is automatically reconfigured to update components selected by the end user for the initially-selected product type to components associated with the cross-over product type.

15 Claims, 4 Drawing Sheets

SYSTEM AND METHOD FOR CONFIGURING A CONFIGURABLE PRODUCT

CROSS-REFERENCE TO RELATED APPLICATION

This application is a continuation of application Ser. No. 11/678,705, filed Feb. 26, 2007 now U.S. Pat. No. 8,209,237, which is incorporated herein by reference in its entirety.

BACKGROUND OF THE INVENTION

1. Field of the Invention

The present invention relates in general to the field of information handling system manufacture, and more particularly to a system and method for configuring a configurable product, such as an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Configurable manufacture or supply of information handling systems offers end users unprecedented control over the components used to build their systems. Generally, an end user is presented with a variety of component choices from which the end user selects desired components. The information handling system ordered by the end user is built from or modified to include components selected by the end user and then provided to the end user. This configurability of information handling systems provides end users with flexibility to acquire information handling systems to meet desired performance and cost goals. For example, an enterprise might order one type of system for administrative help that uses lower cost components capable of running office applications and another type of system for engineers that uses more expensive components capable of running engineering applications. Typical component selections made by an end user include the main processor, the amount of memory, the hard disk drive storage capacity or speed, the graphics processor capability, the housing size and characteristics, the battery capacity, the operating system, software applications and a variety of other parameters. After end user selection of desired components, the ordered configuration of components can be forwarded to a manufacture facility for assembly or otherwise finally assembled for the end user.

Although configurability offers end users greater flexibility, the presentation of component choices to the end user can involve considerable complexity. In general, a multitude of component types and component manufacturers are available for the assembly of information handling systems, however, not all components interoperate in an ideally-compatible manner. As an example, a highly-capable processor may operate at only a fraction of its capability when an inadequate amount of memory is present. As another example, high-end central and graphics processing components tend to generate more heat than lower end components thus requiring greater cooling capacity. A failure to include adequate cooling capacity can result in throttling of processing components so that system performance falls below end user expectations. To ensure the compatibility of components presented to end users, manufacturers typically offer a variety of chassis models for the end user to make an initial product type selection and then limit choices of components within a selected product type chassis model to a set of compatible components. One difficulty with this approach is that an end user seeking a particular component may select a chassis model type that does not include the sought component as a choice available for selection. Another difficulty with this approach is that an end user may select components for a chassis model type that would better interact in a different chassis model type. Further, an end user may select a product type without fully understanding all the component choices or features they provide.

SUMMARY OF THE INVENTION

Therefore a need has arisen for a system and method which manages component selection for a configurable product by enabling cross-over configurations between multiple product types.

In accordance with the present invention, a system and method are disclosed which provide advantages over previous methods and systems for managing component selection for a configurable product. End user component selections within a product type are automatically monitored to detect a cross-over trigger that indicates a transition to a cross-over product type. Upon detection of a cross-over trigger, the end user is presented with an option to configure the cross-over product type as a replacement for the currently-selected product type.

More specifically, an end user configures an information handling system by selecting components for one of plural product type chassis, such as by selecting the product type and associated components through a graphical user interface with a configuration engine. A cross-over module monitors end user component selections to detect a cross-over trigger, such as selection by the end user of a component that is not compatible with the currently-selected product type or selection by the end user of a combination of components which indicate that the end user would get greater satisfaction from a different product type chassis. Upon detection of a cross-over trigger, the end user is provided with an option to select the product type associated with the cross-over trigger as a replacement for the currently-selected product type chassis. If the end user selects the cross-over product type chassis, a reconfiguration module reconfigures the components selected by the end user to be compatible with the cross-over product type chassis. After completing the selection of components, an order for the configuration selected by the end user can be forwarded to a manufacture facility for building of the product or via other final assembly method.

The present invention provides a number of important technical advantages. One example of an important technical advantage is that configurable product component selections are managed to increase the number of components available for selection by an end user. End users who seek a component that is incompatible with a selected product type are offered an opportunity to cross over to another product type that is compatible with the sought component. The ability to cross over between product types reduces end user confusion related to selection of a specific component by the end user that is independent of product type. End users who seek a component configuration for a selected product type are offered an opportunity to see and select a full-range of component options to cross over to another product type where the other product type has greater compatibility with desired features. The ability to cross over between product types increases end user satisfaction by enhancing the performance of components of a selected configuration and by avoiding any limitations imposed by an initial product type selection that may not be fully compatible with the end user's desired features and functions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Configuration of products, such as information handling systems, is enhanced by automated cross over between product types based upon end user component selections. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory, one or more processing resources such as a central processing unit or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
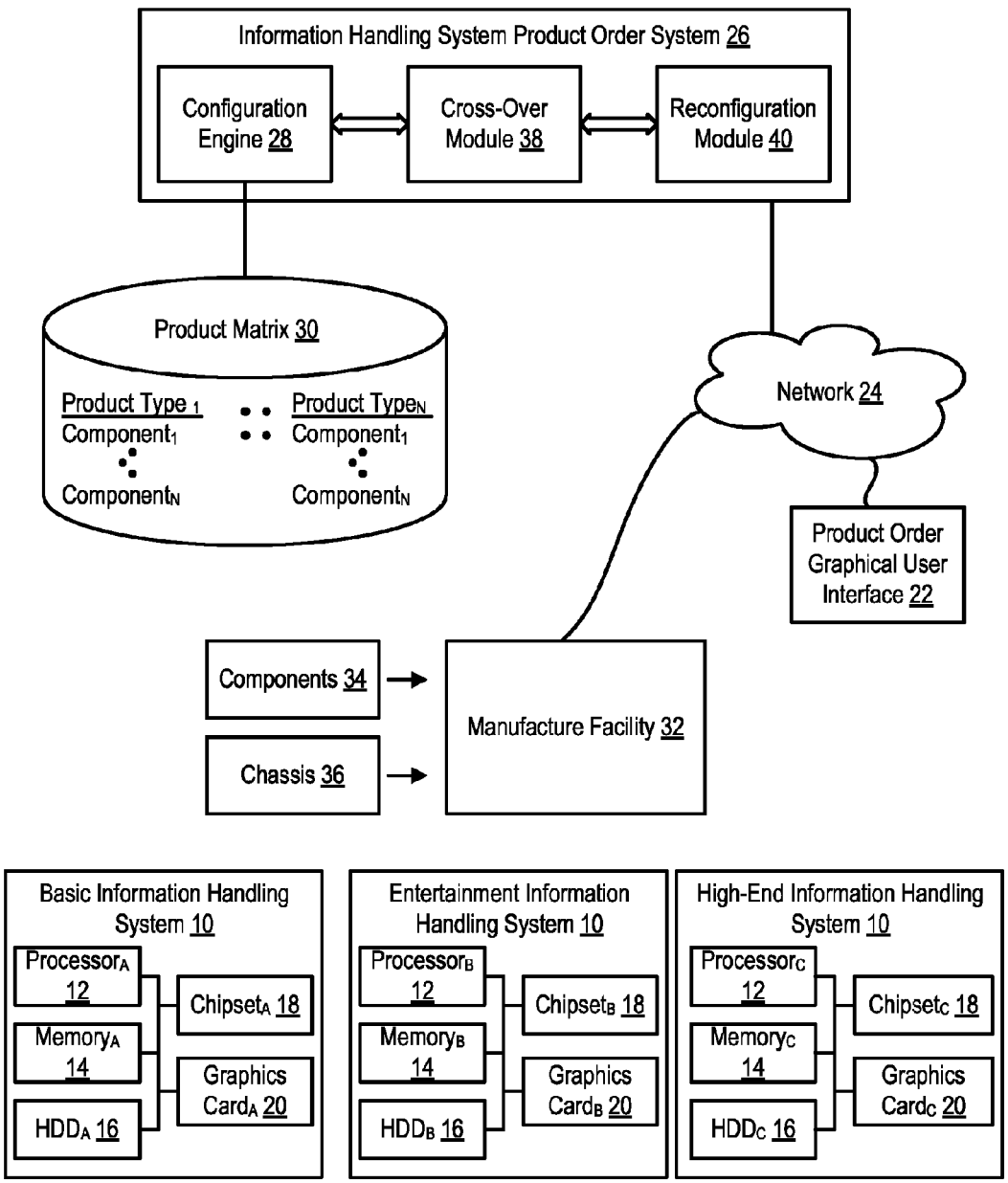
FIG. 1 depicts one embodiment of a block diagram of a system for configuring a configurable information handling system with cross over between plural product types.

Referring now to FIG. 1, a block diagram depicts one embodiment of a system for configuring an information handling system with cross over between plural product types. Information handling systems 10 are configured based on end user selections of product type and components. In the present example, three product types depicted by FIG. 1 are a basic information handling system, an entertainment information handling system and a high-end information handling system. Although each information handling system 10 is built with a generally common architecture of components, such as a processor 12, memory 14, a hard disk drive 16, a chipset 18 and a graphics card 20, the different product types are built from different chassis systems having support functions specialized for the product type. For example, a basic information handling system 10 typically needs components selected for main stream productivity applications which are less resource intensive and may require reduced cooling capacity; an entertainment information handling system 10 typically needs increased storage to save multimedia files and higher level processing and other components for digital video and images; and a high-end information handling system 10 typically has components for resource intense applications such as gaming or engineering work, which might include a motherboard compatible with multiple processors, larger quantities of memory or extra expansion cards, so that maximum performance levels are available. Although FIG. 1 depicts an example having these three configurable information handling system product types, the present invention applies to other products that are assembled to end user specifications.

In the embodiment of FIG. 1, end users place product orders through a product order graphical user interface 22 which communicates through a network 24 with an information handling system product order system 26. For instance, product order graphical user interface 22 presents a series of order forms through a Web browser which are downloaded through the Internet from a server information handling system that runs product order system 26. A configuration engine 28 determines product choices available for presentation through product order graphical user interface 22 based on a product matrix 30 or similar database. Product matrix 30 includes plural product types with each product type having an associated set of components, such as processors, hard disk drives, memory and graphics subsystems. Configuration engine 28 accepts an end user selection of a product type input through product order graphical user interface 22 and applies the product type selection to present components associated with the product type to the end user. Once the end user finishes configuration of the product by selection of desired components through product order graphical user interface 22, product order system 26 forwards the configuration as an order to a manufacture facility 32. Manufacture facility 32 pulls selected components from a component inventory 34 to populate a selected chassis pulled from a chassis inventory 36 and ships the configured product to the end user.

During configuration of the product by the end user, a cross-over module 38 monitors selections made by the end user to detect a cross-over trigger indicating that the end user's component selections suggest that the end user should consider an alternative product type. Upon detection of a cross-over trigger, cross-over module 38 presents an option to the end user through product order graphical user interface 22 to cross over from the currently selected product type to a product type associated with the cross-over trigger. If the end user refuses the cross-over option, configuration engine 28 continues with the presentation of components associated with the currently-selected product type. If the end user accepts the cross-over option, a reconfiguration module 40 analyzes the component selections made by the end user to adjust the components to the cross-over product type. Configuration engine 28 then continues with the presentation of components associated with the cross-over product type for selection of a configuration by the end user. After completion of the configuration of the cross-over product, the order is forwarded to manufacture facility 32 for building of the product to the order selected by the end user.

Cross-over module 38 detects a cross-over trigger based on a variety of factors. One cross-over factor is the selection by the end user of a component that is not compatible with the currently-selected product type. As an example, a selected product type may not support a certain high-end processor as a component. This can occur for many reasons including an incompatibility due to a number of issues, such as inadequate cooling, improper motherboard sockets, lower speed communication buses or other design elements not compatible with that processor choice. Thus, in such a situation, in the embodiment of FIG. 1, the higher-end processor instead of being hidden as incompatible can be shown as an option. Selection of the high-end processor as a component to build into a basic chassis would initiate a cross-over trigger to cross over from the basic to the high-end chassis. Extending this example situation further, if the end user accepts the cross over to the high-end chassis, reconfiguration module 40 compares the currently selected components of the basic chassis with available components for the high-end chassis and maps them to the high-end chassis options. For example, the amount of memory selected by the end user may be compared with a minimum amount associated with the high-end chassis and automatically increases the amount of memory if necessary. Another cross-over factor is the selection of a set of components that, while compatible with the currently-selected product type, suggest the end user may receive greater satisfaction from a different product type. As an example, an end user who selects a basic information handling system chassis and configures the basic chassis with several components typically suggested for an entertainment information handling system may initiate a cross-over trigger to cross over to an entertainment chassis product type.

Figure 2:
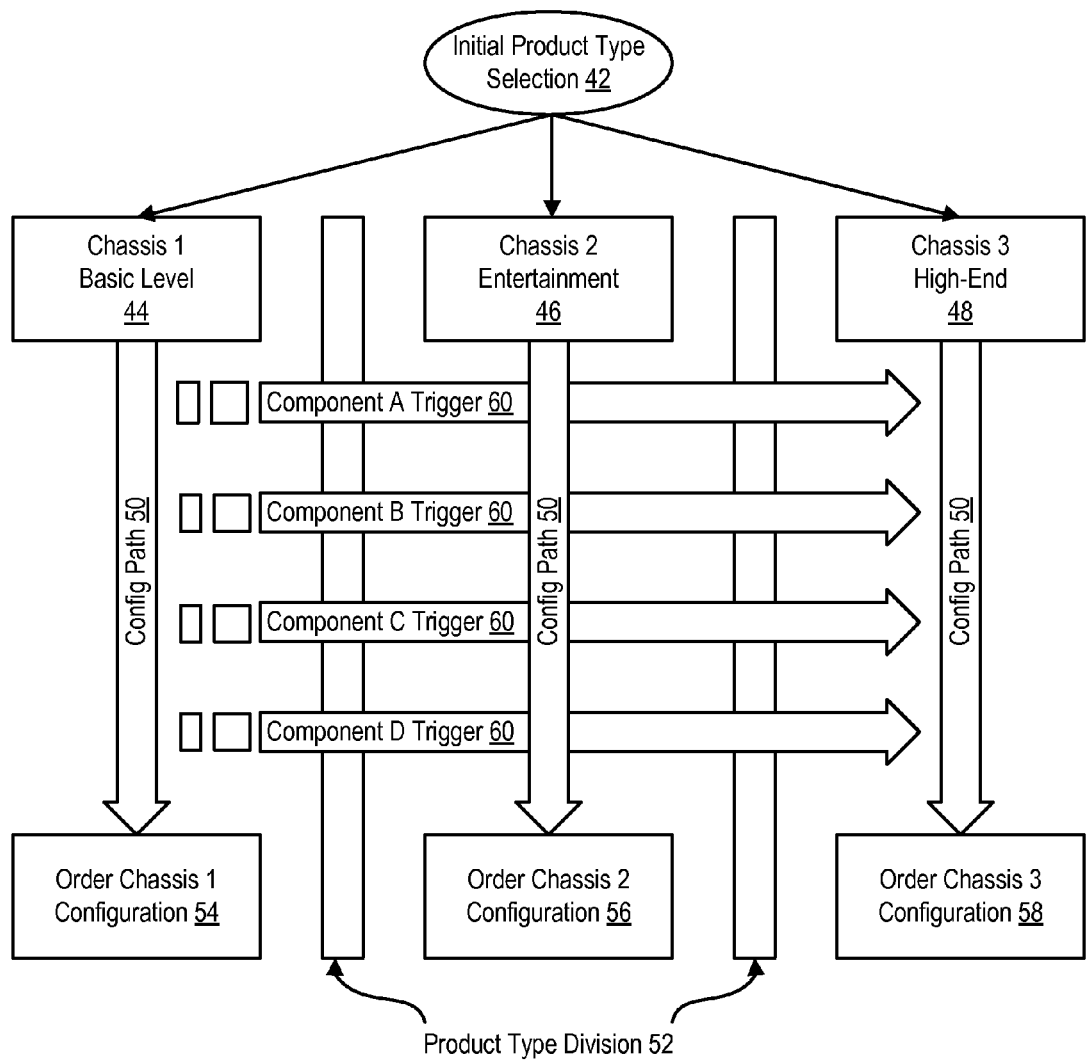
FIG. 2 depicts one embodiment of a process flow for a graphical user interface that provides cross over between product types based upon end user component selection.

Referring now to FIG. 2, a process flow is depicted of one embodiment for a graphical user interface that provides cross over between product types based upon end user component selection. Each step through the process flow is supported by the presentation of one or more interactive graphical images that accept end user selections. At step 42, an end user makes an initial product type selection from the graphical user interface, such as through interactive icons that depict each available product type. If the end user selects a basic chassis product type, the process flow continues to step 44 to present basic chassis components for selection end user. If the end user selects an entertainment chassis product type, the process flow continues to step 46 to present entertainment chassis components for selection by the end user. If the end user selects a high-end chassis product type, the process flow continues to step 48 to present high-end chassis components for selection by the end user. Each product type selection leads to a configuration path 50 of individual component selections that are separated by product type divisions 52, such as selections of components A through D as depicted. Upon completion of component selections through configuration path 50, an order to be built is generated for the basic, entertainment or high-end chassis at steps 54, 56 or 58 respectively.

As the end user traverses component selections along configuration path 50, the component selections made by the end user are monitored to detect cross-over triggers 60. If an end user component selection generates a cross-over trigger 60, the process flow traverses product type divisions 52 to arrive at the configuration path 50 of the product type associated with the cross over trigger. For example, selection at the basic chassis configuration path of a component associated with the entertainment chassis initiates a cross over to the entertainment chassis configuration path. Selection at the basic chassis configuration path of a component associated with the high-end chassis initiates a cross over to the high-end chassis configuration path. Selection at the entertainment chassis configuration path of a component associated with the high-end chassis initiates a cross over to the high-end chassis configuration path. Although the arrows for cross-over triggers 60 depict traversing of product type divisions 52 in one direction, in alternative embodiments, traversing in either or both directions from basic to high-end product types is possible.

Figure 3:
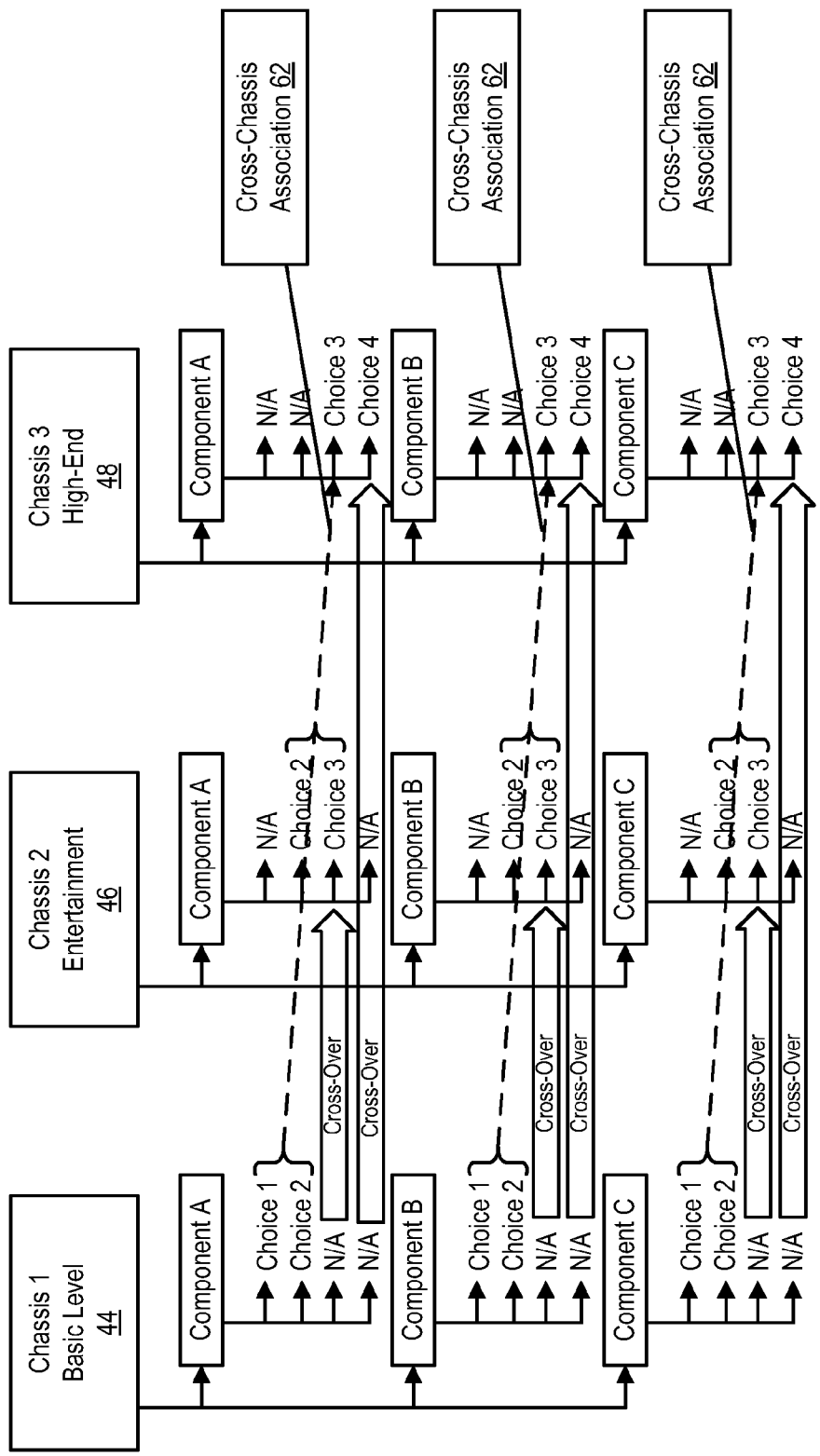
FIG. 3 depicts one embodiment of an example of component associations used for reconfiguration of end user component selections in response to a product type cross over.

Referring now to FIG. 3, an example is depicted of one embodiment of component associations used for reconfiguration of end user component selections in response to a product type cross over. The complexity of managing greater numbers of component selection choices is simplified by applying cross-chassis associations 62. In the example embodiment depicted by FIG. 3, each product chassis type selection 44, 46 or 48 provides three component selection options to the end user, component A, B or C. For each product type chassis only two of four possible selections for each component are compatible. For example, a basic chassis supports choices 1 and 2 for component A, an entertainment chassis supports choices 2 and 3 for component A and a high-end chassis supports choices 3 and 4 for component A. However, for each product type chassis all four choices are visible and available for component A. In the event that the end user makes a component selection that is incompatible with the currently-selected product type, a cross-over is suggested to a product type that is compatible with the component selection. For instance, as depicted by FIG. 3, selection of choice 3 for component A initiates a cross over from the basic product type chassis to the entertainment product type chassis. Selection of choice 4 for component A initiates a cross over from the basic product type chassis to the high-end product type chassis. To the extent cross-over is displayed and selected, the end user is shown information explaining the effect of moving to the new product type chassis. This may include for example providing the end user with information about the new chassis, the new component mix, the new pricing, and other aspects of the cross-over product type.

One aspect of moving to a new product type is that some component selections available on a lower chassis may not be available on a higher chassis. As shown in FIG. 3, for example, a selection of component Choice 1 for Component A is available on basic chassis 44 but is not available on entertainment chassis 46 or high-end chassis 48. Should an end-user cross-over from chassis 44 to chassis 46 or 48, a choice for Component A of Choice 1 would be mapped to Choice 2 on chassis 46 or to Choice 3 on chassis 48. These choices might reflect for example different graphics component options. Choice 1 might be integrated graphics down on the motherboard that is not considered an available option for chassis 46 or chassis 48. Choice 2 and Choice 3 might be 256M and 512M graphics card components. Choice 4 might be dual graphics card options such as based on NVIDIA SLI available only on the high-end chassis 48. An end-user configuring a basic chassis 44 can be shown not only compatible component options Choice 1 and Choice 2, but also component options Choice 3 and Choice 4 which represent cross-over triggers to the other chassis 46 and 48. Without these component options being made available, the end user might progress to fully configuring and purchasing a basic chassis 44 system unaware of the other component options available, which may be more aligned with the end user's desired features and functions.

Figure 4:
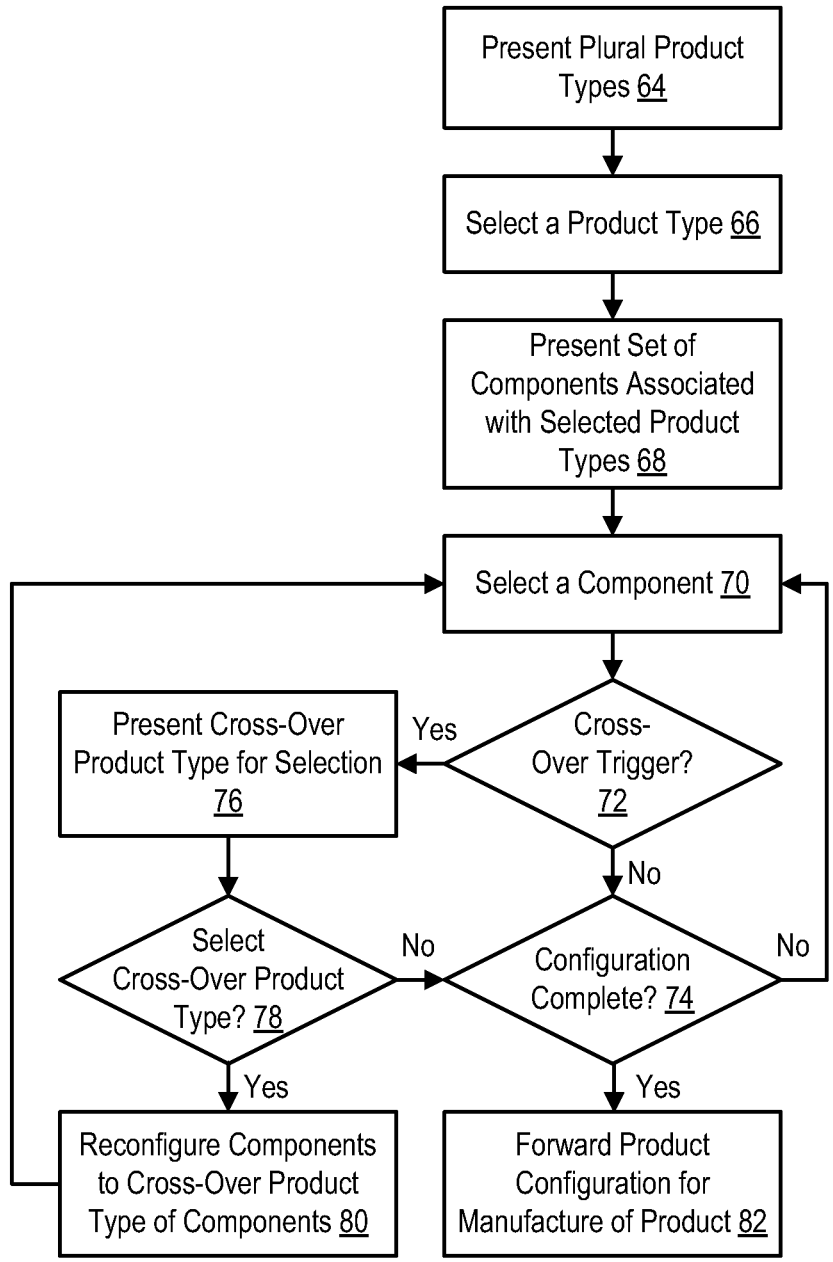
FIG. 4 depicts one embodiment of a flow diagram of a process for managing cross over between plural product types based upon end user component selections.

Referring now to FIG. 4, a flow diagram depicts one embodiment a process for managing cross over between plural product types based upon end user component selections. The process begins at step 64 with presentation of plural product type choices to the end user. At step 66, the end user selects a product type to initiate a configuration of a configurable product. At step 68, the process continues with the presentation of a set of components associated with the selected product type. In one embodiment, the set includes components that are not compatible with the selected product type but offer a cross-over trigger to other product types. Such cross-over components are presented with a unique color, shading or other indication of the associated cross over. At step 70, the end user selects a component from the presented set of components. The process continues to step 72 to determine if the component selection initiates a cross-over trigger. For example, selection of a component not compatible with the currently-selected product type initiates a cross-over trigger. As another example, selection of a component that, taken in consideration with other component selections, suggests that the end user would get greater satisfaction from a different product type initiates a cross-over trigger. If no cross-over trigger exists, the process continues to step 74 to determine if the configuration of the product type is complete and returns to step 70 if the configuration of the product type is not complete. If a cross-over trigger is detected at step 72, the process continues to step 76 to present to the end user a cross-over product type associated with the cross-over trigger. If, at step 78, the end user accepts the cross-over suggestion, the process continues to step 80 to reconfigure components selected by the end user to the cross-over product type and returns to step 70 to continue with the product configuration. If at step 78 the end user refuses the cross-over suggestion, the process continues to step 74. At step 74, if configuration of the configurable product is complete, the process ends at step 82 by forwarding the product configuration selected by the end user as an order for manufacture of the product.

Although the present invention has been described in detail, it should be understood that various changes, substitutions and alterations can be made hereto without departing from the spirit and scope of the invention as defined by the appended claims.

What is claimed is:

1. A method for configuring products, the method comprising:
   accepting a first product type selection from the end user through the graphical user interface;
   in response to accepting, presenting at the graphical user interface at least some components associated with the first product type to the end user through the graphical user interface;
   accepting one or more component selections from the end user through the graphical user interface, the one or more component selections replacing at least some of the components associated with the first product type;
   determining a cross-over trigger from the component selections;
   presenting at the graphical user interface a second product type associated with the cross-over trigger to the end user as a replacement for the selected product type;
   accepting a selection by the end user of the second product type as a replacement for the first product type; and
   mapping one or more component selections accepted from the end user to components associated with the second product type.

2. The method of claim 1 wherein the products comprise information handling systems and the plural product types comprise chassis models.

3. The method of claim 2 wherein the components comprise one or more of a processor, memory, a hard disk drive and graphics.

4. The method of claim 1 wherein changing one or more of the component selections accepted from the end user comprises increasing memory associated with the product type from a first storage capacity to a second storage capacity.

5. The method of claim 1 wherein determining a cross-over trigger further comprises:
   determining that at least one of the component selections from the end user is compatible with a product type other than the selected product type.

6. The method of claim 1 further comprising:
   accepting a rejection by the end user of the second product type as a replacement for the first product type; and
   allowing the end user to continue configuring the first product type and component selections.

7. A system for configuring products, the system comprising:
   a configuration engine executing on an information handling system and operable to present plural product types to an end user, each product type having an associated set of plural components, the configuration engine further operable to accept a product type selection from the end user and to accept one or more component selections from the end user to configure a product of the selected product type; and
   a cross-over module interfaced with the configuration engine, the cross-over module operable to monitor the component selections to detect a cross-over trigger associated with a cross-over product type, and to present the cross-over product type in response to the cross-over trigger to the end user for selection as a replacement to the selected product type, to accept a selection by the end user of the cross-over product type as a replacement for the selected product type; and to map one or more component selections accepted from the end user to components associated with the cross-over product type.

8. The system of claim 7 wherein the product comprises an information handling system.

9. The system of claim 8 wherein the set of components comprise one or more of a processor, memory, a hard disk drive and graphics.

10. The system of claim 8 wherein the cross-over trigger comprises determining that at least one of the component selections accepted from the end user is compatible with a product type other than the selected product type.

11. The system of claim 8 wherein the product types comprise one or more of a basic chassis, an entertainment chassis and a high-end chassis.

12. A graphical user interface operable to present images, the graphical user interface comprising:
   a display operable to present images;
   a processor interfaced with the display, the processor having instructions operable to generate images at the display to:
   present plural product types to an end user;
   accept a product type selection from the end user;
   present components associated with the product type selection to the end user;
   accept component selections from the end user;

determine a cross-over trigger from the component selections;

present a cross over product type associated with the cross-over trigger to the end user as a replacement for the selected product type;

accept a selection by the end user of the cross over product type as a replacement for the selected product type; and map one or more component selections accepted from the end user to components associated with the cross over product type.

13. The graphical user interface of claim 12 wherein the product types comprise information handling system models.

14. The graphical user interface of claim 12 wherein the cross-over trigger comprises at least one of the component selections accepted from the end user that is compatible with a product type other than the selected product type.

15. The graphical user interface of claim 12 wherein the cross-over trigger comprises compatible component selections accepted from the end user indicating the end user should cross-over to a product type other than the selected product type.

\* \* \* \* \*